United States Patent Office 3,632,845
Patented Jan. 4, 1972

3,632,845
SOLUBLE CURED POLYESTER POLYURETHANES
John E. Brownsword, Cuyahoga Falls, Ohio, assignor to The Goodyear Tire & Rubber Company, Akron, Ohio
No Drawing. Continuation-in-part of application Ser. No. 539,664, Apr. 4, 1966. This application Mar. 5, 1969, Ser. No. 804,650
The portion of the term of the patent subsequent to May 27, 1986, has been disclaimed
Int. Cl. C08g 22/10, 51/34
U.S. Cl. 260—75 NH                    9 Claims

ABSTRACT OF THE DISCLOSURE

A cured polymeric polyurethane and a method for its preparation which comprises reacting, in required amounts, an organic diisocyanate selected from toluene diisocyanate and mixtures of toluene diisocyanate with diisocyanates selected from 4,4'-diphenyl methane diisocyanate and 4,4'-dicyclohexyl methane diisocyanate with a mixture comprising a hydrocarbon diol additive having from 2 to 10 carbon atoms and having terminal hydroxyl groups, a diamino diphenyl sulfone and a polymeric polyester having a molecular weight of from about 700 to about 2500 derived from certain hydrocarbon diols having terminal hydroxyl groups and from dicarboxylic acids selected from adipic acid and azelaic acid, wherein the isocyanato groups of the diisocyanate are equal to from about 92 to about 97 percent of the total reactive hydrogens supplied by the polymeric polyester, the hydrocarbon diol additive and the diamino diphenyl sulfone, and curing the reaction mixture.

---

This application is a continuation-in-part of my earlier filed co-pending application Ser. No. 539,664, filed Apr. 4, 1966, now U.S. Pat. 3,446,781.

This invention relates to cured polymeric materials prepared from isocyanate-modified polyesters, to methods of preparing them, and to products prepared therefrom.

Polyurethanes have been prepared by the reaction of organic polyisocyanates with polymeric polyesters. Various diamine curatives have been added to the products of such reactions to form cured polyurethanes. Typically such cured polyurethanes have had to be prepared by prepolymer methods in order to provide cured polyurethanes having commercially useful properties that are still substantially soluble in relatively nontoxic low cost solvents such as the lower ketones.

Now it has been found that cured polyurethanes substantially soluble in solvents such as the lower ketones and having a variety of useful commercial properties can be prepared wherein certain organic diisocyanates are reacted with a mixture of a particular type of polyester, a hydrocarbon diol additive, and a sulfone diamine in certain critical ratios.

In accordance with this invention, a method of preparing a cured polymeric polyurethane characterized by being substantially soluble in methyl ethyl ketone comprises reacting from about 1.5 to about 1.7 mols of an organic diisocyanate selected from at least one of the group consisting of toluene diisocyanate, 4,4'-diphenyl-methane-diisocyanate and 4,4'-dicyclo hexyl methane diisocyanate with a mixture comprising from about 0.4 to about 0.6 mol of a hydrocarbon diol additive having from 2 to about 10 carbon atoms and having terminal hydroxyl groups, from about 0.03 to about 0.05 mol of a diamine diphenyl sulfone, and 1.0 mol of a polymeric polyester condensation reaction product of a dicarboxylic acid selected from adipic acid, azelaic acid and their anhydrides and a saturated hydrocarbon diol having terminal hydroxyl groups selected from diols having from two to six carbon atoms where the polyester has a molecular weight of from about 700 to about 2500 and an acid number of less than about 10, wherein the isocyanato groups of the diisocyanate are equal to from about 92 to about 97 percent of the total reactive hydrogens supplied by the polymeric polyester, the hydrocarbon diol additive, and the diamino diphenyl sulfone, and curing the reaction mixture.

In preparing the polyurethanes of this invention it is usually preferable to adjust the ratio of the reactants so that the isocyanate groups of the diisocyanate are equal to from about 94 to about 97 percent and more preferably from about 94 to about 96 percent of the total reactive hydrogens supplied by the polymeric polyester, the hydrocarbon diol additive, and the diamino diphenyl sulfone. The reactive hydrogens are supplied by hydroxyl groups and amino groups.

Thus, it is an important feature of this invention that in addition to reacting certain amounts of certain materials, a particular order of addition is important in that it is preferred that first a mixture is prepared of the polyester, hydrocarbon diol additive, and the sulfone diamine and then the organic diisocyanate is added to the mixture.

Various hydrocarbon diols and mixtures of diols having from 2 to 10 carbon atoms with terminal hydroxyl groups, and preferably from 2 to 6 carbon atoms can be used to prepare the polyurethanes of this invention and the polyesters used therein. Representative are saturated diols such as ethylene glycol, 1,4-butane diol, 1,5-pentane diol, and 1,6-hexane diol, and unsaturated diols such as 2-butene-1,4-diol, pentene diol and hexene diol.

The diamine curatives of this invention are diamino diphenyl sulfones. Representative of such sulfones are 4,4'-diamino diphenyl sulfone and 3,3'-diamino diphenyl sulfone.

The diisocyanates used in this invention include mixtures of toluene diisocyanate and 4,4'-diphenyl methane diisocyanate containing up to about 90 percent and preferably up to about 80 percent by weight 4,4'-diphenyl methane diisocyanate.

Toluene diisocyanate commonly exists in 2,4 and 2,6 substituted toluene forms. Thus, in this specification, 2,4-toluene diisocyanate and 2,6-toluene diisocyanate and their mixtures are generally simply referred to as toluene diisocyanate. If a mixture is used, it is usually preferred to use a mol ratio of from about 70/30 to about 90/10 of 2,4-toluene diisocyanate to 2,6-toluene diisocyanate.

It has been found that substantial unexpected differences in properties of the soluble cured polyurethane result when a polyester is used having a molecular weight of from about 1500 to about 2500, preferably from about 1800 to about 2200, rather than a molecular weight of from about 700 to about 1500, preferably from about 800 to about 1200. Comparatively, by using the higher molecular weight polyesters, the physical properties can be substantially changed even though the cured polyurethane still remains substantially soluble in lower ketones such as methyl ethyl ketone.

Further substantial differences in physical properties of the soluble cured polyurethane occur with the substitution of the various diols such as, for example, ethylene glycol and 1,4-butane diol and with the substitution of various adipates and azelates such as, for example, the ethylene glycol, 1,4-butane diol and 1,6-hexane diol adipates, and the 1,4-butane diol azelates.

For example, a soluble cured polyurethane prepared from toluene diisocyanate, 4,4'-diamino diphenyl sulfone, ethylene glycol, and ethylene glycol adipate of about 800 to about 1200 molecular weight can have an ultimate tensile strength (tensile) of from about 50 to about 200 pounds per square inch with an elongation of from about 500 to about 1000 percent measured by standard methods at 24° C. and 50 percent relative humidity. However, by merely increasing the adipate molecular weight to about 1800 to 2200, the physical properties can be substantially changed to a tensile in the range of from about 2000 to about 3500 with an elongation of from about 400 to about 1000.

By substituting 1,4-butane diol for the ethylene glycol in these two recipes, surprisingly soluble cured polyurethanes having elongations in excess of from about 1100 to 1150 with tensile in excess of about 100 to 500 can be obtained with the lower molecular weight ethylene glycol adipate. With the higher molecular weight ethylene glycol adipate, tensiles of from about 1000 to about 3000 with corresponding elongations of from about 500 to about 1000 can be obtained.

Surprisingly, it was found that if 1,6-hexane diol adipates having molecular weights of about 800 to about 1200 and from about 1800 to about 2200 were substituted for the ethylene glycol adipate and 1,4-butane diol adipate of corresponding molecular weights, substantial results could be obtained. For example, with the lower molecular weight hexane diol adipate and ethylene glycol a tensile of about 3500 to about 4500 and an elongation of about 500 to about 800 could be obtained whereas with 1,4-butane diol a tensile of about 1000 to about 2000 and an elongation of about 600 to about 900 could be obtained. However, with the higher molecular weight hexane diol adipate and ethylene glycol a tensile of from about 2000 to 3500 with an elongation of from about 500 to about 800 could be obtained, whereas with 1,4-butane diol a tensile of about 2000 to 3000 with an elongation of about 500 to about 700 could be obtained.

As a further illustration, a methyl ethyl ketone soluble cured polyurethane prepared from toluene diisocyanate, 4,4'-diaminodiphenyl sulfone, 1,4-butane diol and 1,4-butane diol adipate having a molecular weight of from about 700 to about 1500 can have a tensile of from about 300 to about 800 and an elongation from about 500 to about 900 and is particularly useful as an adhesive for bonding substrates. In this latter illustration, if a weight ratio of from about 1:4 to about 4:1 of toluene diisocyanate to 4,4'-diphenyl-methane diisocyanate were used instead of the toluene diisocyanate, the physical properties can be correspondingly changed to a tensile ranging from about 80 to about 5500 and an elongation ranging from about 500 to about 1000.

Thus, in the preceding illustrative examples, substantial changes in physical properties were evidenced by substituting specific reactants.

In the practice of this invention, if desired, the mixture of the polyester, hydrocarbon diol additive, and sulfone diamine may be heated to reduce its viscosity before adding the diisocyanate. After the addition of the diisocyanate, the polymerization reaction is generally carried out over a period of from about a minute up to an hour or more. Generally a reaction time of from about 1 to about 10 minutes is sufficient to prepare the polymeric polyurethanes of this invention. The temperature of the polymerization reaction is not critical and can be varied over a wide range. Suitable reaction temperatures are from about 60° C. to about 120° C., although higher or lower temperatures can be used. Also, the reaction pressure is not critical and may be atmospheric or below or above atmospheric pressure.

The resulting polyurethane is then heated to effect the cure. It is generally preferred that the polyurethane is cured in an inert and dry atmosphere. A temperature of from about 120° C. to about 200° C. for about 10 minutes to about 6 hours at about atmospheric pressure is generally sufficient to effect the cure although higher or lower pressures can be used.

While various solvents can be used to dissolve the cured polyurethanes of this invention, it has surprisingly been found that these cured polyurethanes are substantially soluble in methyl ethyl ketone. It is a particular advantage to dissolve cured polymeric polyurethanes having superior physical properties in such a solvent because of the relatively low cost of the solvent, its low toxicity and its relatively high volatility. Solvents and mixtures of solvents which are generally used for forming solutions of other polyurethanes having superior physical properties can also be used although they are more toxic and more costly than methyl ethyl ketone. Representative examples of such other solvents include dimethyl formamide, dimethyl acetamide, dimethyl propionamide, dimethyl sulfoxide, and tetrahydrofuran.

The solutions of this invention may be formed by the method of preparing solutions of elastomers known to those skilled in the art. The cured polyurethane solvent mixture may be heated to decrease the time required to prepare these solutions. Generally, solutions of up to about 30 percent by weight solids content of the cured polyurethane can be obtained at about 20° C., with the solution becoming more viscous as the solids content is increased. Thus, the solids content of the solution can be varied depending upon the intended application or use.

It is a particular commercial advantage of this invention that the cured polyurethanes can be prepared and stored as solutions in low-cost and relatively nontoxic solvents for long periods of time. The solution can then be used to coat various structural surfaces or fabrics, for forming various structures, and for various castings, cements, and the like.

The following examples further illustrate this invention. The parts and percentages are by weight unless otherwise indicated.

EXAMPLE I

Into a suitable reactor was placed 100 parts of a polyester prepared by the condensation of 1,4-butane diol with adipic acid. The polyester had a molecular weight of approximately 1000, an hydroxyl number of approximately 100, and an acid number of approximately 0.5. The polyester was liquified by heting to about 90° C. The liquified polyester was stirred for one hour at about 90° C. at a reduced pressure of about 5 to about 10 millimeters of mercury absolute. The pressure was then readjusted to atmospheric pressure. To 5.4 parts of 1,4-butane diol, from which water had been removed by distilling about 10 percent by weight of the diol, was added 0.95 part of 4,4'-diamino diphenyl sulfone. The 4,4'-diamino diphenyl sulfone was dissolved in the 1,4-butane diol at about 50° C. and the resulting solution added to the liquified polyester. The mixture was stirred for about 5 minutes until the temperature of the mixture was allowed to reach about 80° C. to 90° C. At this time, 27.4 parts of an 80/20 (mol ratio) mixture of 2,4- and 2,6-toluene diisocyanate was added. The mixture was stirred for an additional 2 minutes and quickly poured into a pint can, and the pint can covered to maintain an inert atmosphere. The pint can had previously been pre-dried by heating to about 110° C. The mixture in the pint can was cured by placing it in a hot air oven at about 140° C. for about 3½ hours.

The cured material was broken into small particles and added to 6 parts of methyl ethyl ketone at about 70° C. After all of the particles had dissolved in the methyl ethyl ketone, the resultant viscous solution was coated onto a glass plate and allowed to dry. The resulting coating was of about 5 mils thickness and had an ultimate tensile strength of about 540 pounds per square inch, an ultimate elongation of about 740 percent, and a Shore A hardness of about 50. The coating had particular utility as an adhesive for bonding substrates.

In these examples the ultimate tensile strengths and corresponding ultimate elongations were determined at 24° C. and at a 50 percent relative humidity.

EXAMPLE II

A soluble cured polyurethane was prepared according to the method of Example I except that ethylene glycol adipate having a molecular weight of about 1000 was used instead of the butane diol adipate and 3.7 parts of ethylene glycol was used instead of the 1,4-butane diol. The toluene diisocyanate and diamine were adjusted to 27.8 and 1.4 parts respectively. The resulting cured polymer, soluble in methyl ethyl ketone, had an ultimate tensile strength of about 91 pounds per square inch and an elongation of about 753 percent.

EXAMPLE III

A soluble cured polyurethane was prepared according to the method of Example II except that various amounts of 1,4-butane diol, instead of the ethylene glycol were mixed with the 1000 molecular weight ethylene glycol adipate. The physical properties resulting from the use of the various amounts of 1,4-butane diol and various amounts of the toluene diisocyanate (TDI) are shown in the following table. Note that the elongations surprisingly exceeded the capabilities of the measuring apparatus. Therefore, both the ultimate elongations and ultimate tensile strengths are in excess of those reported in this table.

TABLE 1

| TDI | 1,4-butane diol | Tensile | Elongation |
|---|---|---|---|
| 41.2 | 12.6 | 300+ | 1,107+ |
| 38.0 | 10.8 | 159+ | 1,040+ |
| 34.6 | 9.0 | 87+ | 1,038+ |
| 31.2 | 7.2 | 117+ | 1,115+ |
| 27.8 | 5.4 | 320+ | 1,110+ |

EXAMPLE IV

A soluble cured polyurethane was prepared according to the method of Example II except that an ethylene glycol adipate having a molecular weight of about 2000 was used instead of the 1000 molecular weight ethylene glycol adipate. The resulting physical properties of the various cured polyurethanes are shown in the following table:

TABLE 2

| TDI | Ethylene glycol | Tensile | Elongation |
|---|---|---|---|
| 21.2 | 4.4 | 2,206 | 700 |
| 15.8 | 2.5 | 3,018 | 638 |
| 14.4 | 1.9 | 2,678 | 540 |
| 12.7 | 1.3 | 2,565 | 520 |

EXAMPLE V

Soluble cured polyurethanes were prepared according to the method of Example IV except that 1,4-butane diol, instead of the ethylene glycol, was mixed with the high molecular weight ethylene glycol adipate. The resulting physical properties of the various cured polyurethanes are shown in the following table:

TABLE 1

| TDI | 1,4-butane diol | Tensile | Elongation |
|---|---|---|---|
| 21.1 | 6.3 | 1,202 | 437 |
| 19.6 | 5.4 | 2,867 | 615 |
| 17.7 | 4.5 | 2,538 | 635 |
| 16.1 | 3.6 | 2,422 | 580 |
| 16.9 | 2.7 | 2,243 | 585 |
| 12.7 | 1.8 | 2,140 | 575 |

EXAMPLE VI

A soluble cured polyurethane was prepared according to the method of Example I except that a 1,6-hexane diol adipate having a molecular weight of about 2000 instead of the 1,4-butane diol adipate was used. In this example 13.8 parts of the toluene diisocyanate and 2.6 parts of the 1,4-butane diol were used. The resulting cured polyurethane had an ultimate tensile strength of 2506 and an elongation of 615. It had a very high 100 percent modulus of 942 pounds per square inch.

EXAMPLE VII

A cured polyurethane was prepared according to the method of Example VI except that ethylene glycol was used instead of the 1,4-butane diol. In this example 13.8 parts of the toluene diisocyanate and 1.7 parts of the ethylene glycol were used. The resulting cured polyurethane had an ultimate tensile strength of 2788 and an elongation of 670. It also had a very high 100 percent modulus of 813.

EXAMPLE VIII

A soluble cured polyurethane was prepared according to the method of Example VII except that a 1,6-hexane diol adipate having a molecular weight of about 1000 was used. In this example 24.5 parts of the toluene diisocyanate and 3.2 parts of the ethylene glycol were used. The resulting cured polyurethane had an ultimate tensile strength of 4128 and an elongation of 655.

EXAMPLE IX

A soluble cured polyurethane was prepared according to the method of Example VII except that 1,4-butane diol was used instead of the ethylene glycol. In this example 27.2 parts of the toluene diisocyanate and 5.3 parts of the 1,4-butane diol was used. The resulting cured polyurethane had an ultimate tensile strength of 1547 and an elongation of 720.

EXAMPLE X

Soluble cured polyurethanes were prepared according to the method of Example I except that mixtures of the toluene diisocyanate and 4,4'-diphenyl methane diisocyanate were used instead of the toluene diisocyanate. The various amounts of reactants and resulting physical properties of the cured polyurethanes are shown in the following table:

TABLE 4

| TDI | MDI | TDI/MDI mole ratio | Tensile | Elongation |
|---|---|---|---|---|
| 6.9 | 29.5 | 1/3 | 5,040 | 593 |
| 13.8 | 19.7 | 1/1 | 96 | 853 |
| 20.6 | 9.8 | 3/1 | 102 | 900 |
| 8.3 | 28 | 3/7 | 4,470 | 663 |

EXAMPLE XI

Cured polyurethanes soluble in methyl ethyl ketone were prepared according to the method of Example I except that a 1,4-butane diol azelate having a molecular weight of 1000 was used instead of the butane diol adipate having a molecular weight of 1000. The two soluble cured polyurethanes of this example were prepared by using 38.5 and 39.5 parts of 4,4'-diphenyl methane diisocyanate (MDI) respectively, instead of the toluene diisocyanate. The various amounts of reactants and resulting physical properties of the cured polyurethane are shown in the following table:

TABLE 5

| 1,4-butane diol azelate | Butane diol | Diamine | MDI | Tensile | Elongation |
|---|---|---|---|---|---|
| 100 | 5.4 | 0.95 | 38.5 | 3,481 | 585 |
| 100 | 5.4 | 0.95 | 39.5 | 5,640 | 530 |

From the results of this example, it is illustrated that a soluble cured polyurethane prepared by reacting 4,4'-diphenyl methane diisocyanate with a mixture of 1,4-butane diol, 4,4'-diamino diphenyl sulfone and 1,4-butane diol azelate can have ultimate tensile strengths in the range of from about 3000 to about 6000, with elongations of from about 500 to about 600, and yet is still substantially soluble in methyl ethyl ketone.

EXAMPLE XII

Into a suitable reactor was placed 100 parts of a polyester prepared by the condensation of 1,4-butane diol with adipic acid. This polyester had a hydroxyl number of approximately 100, an acid number of approximately 0.5, and a molecular weight of approximately 1000. The polyester was heated to 90° C. to liquefy the polyester. The liquefied polyester was stirred for one hour at 90° C. at a reduced pressure of about 5 to 10 millimeters of mercury absolute. The pressure was then adjusted to atmospheric pressure. To 5.43 parts of 1,4-butane diol, from which water had been removed by distilling 10 percent by weight of the diol, was added 0.95 part of 4,4'-diamino diphenyl sulfone. The 4,4'-diamino diphenyl sulfone was dissolved in the 1,4-butane diol at about 50° C. and the resulting solution added to the liquefied polyester. The mixture was stirred for 5 minutes until the temperature of the mixture was allowed to reach 80° C. At this time, 39.7 parts of 4,4'-diphenyl methane diisocyanate was added to the stirred mixture. The mixture was stirred for an additional 2 minutes and quickly poured into a pint can, and the pint can covered to maintain an inert atmosphere. The pint can had previously been pre-dried by heating to 110° C. The mixture in the pint can was cured by placing it in a hot air oven at 140° C. for 3½ hours.

The cured material was broken into small particles and added to 6 parts of methyl ethyl ketone at about 70° C. After all of the particles had dissolved in the methyl ethyl ketone, the resultant viscous solution was coated onto a glass plate and allowed to dry. The resulting coating was of about 5 mils thickness and had an ultimate tensile strength of about 6000 pounds per square inch, an ultimate elongation of about 650 percent, and a Shore A hardness of about 75.

While certain representative embodiments and details have been shown for the purpose of illustrating the invention, it will be apparent to those skilled in this art that various changes and modifications may be made therein without departing from the spirit or scope of the invention.

What is claimed is:

1. A cured polymeric polyurethane characterized by being substantially soluble in methyl ethyl ketone prepared by the method which comprises reacting from about 1.5 to about 1.7 mols of an organic diisocyanate selected from at least one of the group consisting of toluene diisocyanate, and mixtures of toluene diisocyanate with diisocyanates selected from 4,4'-diphenylmethane diisocyanate and 4,4'-dicyclo hexyl methane diisocyanate with a mixture comprising from about 0.4 to about 0.6 mol of a hydrocarbon diol additive having from 2 to about 10 carbon atoms and having terminal hydroxyl groups, from about 0.03 to about 0.05 mol of a diamine diphenyl sulfone, and 1.0 mol of a polymeric polyester condensation reaction product of a dicarboxylic acid selected from adipic acid, azelaic acid and their anhydrides and a saturated hydrocarbon diol having terminal hydroxyl groups selected from diols having from two to six carbon atoms where the polyester has a molecular weight of from about 700 to about 2500 and an acid number of less than about 10, wherein the isocyanato groups of the diisocyanate are equal to from about 92 to about 97 percent of the total reactive hydrogens supplied by the polymeric polyester, the hydrocarbon diol additive, and the diamino diphenyl sulfone, and curing the reaction mixture.

2. A cured polymeric polyurethane according to claim 1 wherein the isocyanato groups of the diisocyanate are equal to from about 94 to about 97 percent of the total reactive hydrogens.

3. A cured polyurethane according to claim 2 wherein the said hydrocarbon diol additive and hydrocarbon diol polyester component are independently selected from ethylene glycol, 1,4-butane diol, 1,5-pentane diol and 1,6-hexane diol, and the diamino diphenyl sulfone is selected from 4,4'-diamino diphenyl sulfone and 3,3'-diamino diphenyl sulfone.

4. A cured polyurethane according to claim 3 where the polymeric polyester has a molecular weight of from about 700 to about 1500.

5. A cured polymeric polyurethane according to claim 3 which comprises reacting toluene diisocyanate with a mixture which comprises 4,4'-diamino diphenyl sulfone, a diol selected from ethylene glycol and 1,4-butane diol and a polymeric polyester condensation reaction product of a dicarboxylic acid selected from adipic acid, azelaic acid and their anhydrides and a hydrocarbon diol selected from ethylene glycol and 1,4-butane diol where the polymeric polyester has a molecular weight of from about 700 to about 2500.

6. A cured polymeric polyurethane according to claim 3 where the polymeric polyester has a molecular weight of from about 800 to about 1200 and is the condensation product of 1,6-hexane diol and adipic acid.

7. A cured polymeric polyurethane according to claim 5 where the polymeric polyester has a molecular weight of from about 1500 to about 2500.

8. A cured polymeric polyurethane according to claim 1 which comprises reacting from about 1.5 to about 1.7 mole of an organic diisocyanate selected from at least one of the group consisting of toluene diisocyanate and mixtures of toluene diisocyanate with diisocyanates selected from 4,4'-diphenyl methane diisocyanate and 4,4'-dicyclohexyl methane diisocyanate with a mixture comprising from about 0.4 to about 0.6 mol of a hydrocarbon diol additive having from 2 to about 10 carbon atoms and having terminal hydroxyl groups, from about 0.03 to about 0.05 mol of a diamine diphenyl sulfone, and 1.0 mol of a polymeric polyester having an acid number of less than about 10 selected from (A) polyesters having a molecular weight of about 700 to about 2500 obtained by reacting adipic acid with diols selected from ethylene glycol, 1,5-pentane diol and 1,6-hexane diol from (B) such polyester obtained by reacting azelaic acid with a saturated hydrocarbon diol having terminal hydroxyl groups selected from diols having from two to six carbon atoms and from (C) polyesters having a molecular weight of from 1500 to about 2500 obtained by reacting adipic acid with 1,4-butane diol wherein the isocyanato groups of the diisocyanate are equal to from about 92 to about 97 percent of the total reactive hydrogens supplied by the polymeric polyester, the hydrocarbon diol additive and the diamino diphenyl sulfone and curing the reaction mixture.

9. A cured polyurethane according to claim 8 wherein the said hydrocarbon diol additive and the hydrocarbon diol azelaic polyester component are independently selected from ethylene glycol, 1,4-butane diol, 1,5-pentane diol and 1,6-hexane diol, where the polyester has a molecular weight in the range of about 700 to about 1500, and the diamino diphenyl sulfone is selected from 4,4'-diamino diphenyl sulfone and 3,3'-diamino diphenyl sulfone.

References Cited
UNITED STATES PATENTS 2,729,618   1/1956   Mueller et al. _____ 260—75
3,446,781   5/1969   Brownsword _____ 260—75

DONALD E. CZAJA, Primary Examiner

H. S. COCKERAM, Assistant Examiner

U.S. Cl. X.R.

260—30.4, 30.8, 32.6, 32.8, 75 NP, 77.5 AM